United States Patent
Langer et al.

(10) Patent No.: US 9,092,307 B2
(45) Date of Patent: Jul. 28, 2015

(54) ADAPTIVE PREVENTIVE MAINTENANCE FOR COMPUTING SYSTEMS

(71) Applicant: ORACLE INTERNATIONAL CORPORATION, Redwood Shores, CA (US)

(72) Inventors: Yuri Langer, Wheaton, IL (US); Aleksey Urmanov, San Diego, CA (US); Anton Bougaev, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 455 days.

(21) Appl. No.: 13/647,521

(22) Filed: Oct. 9, 2012

(65) Prior Publication Data
US 2014/0101492 A1    Apr. 10, 2014

(51) Int. Cl.
*G06F 11/00* (2006.01)
*G06Q 10/06* (2012.01)

(52) U.S. Cl.
CPC .............. *G06F 11/00* (2013.01); *G06F 11/004* (2013.01); *G06Q 10/0631* (2013.01)

(58) Field of Classification Search
USPC .................................................. 714/25, 47.1
See application file for complete search history.

(56) References Cited

U.S. PATENT DOCUMENTS

| | | | |
|---|---|---|---|
| 7,660,775 B2 | 2/2010 | Bougaev et al. | |
| 2007/0005861 A1* | 1/2007 | Smith | 710/264 |
| 2012/0023372 A1* | 1/2012 | Lin et al. | 714/37 |
| 2012/0210171 A1* | 8/2012 | Lawler et al. | 714/35 |

OTHER PUBLICATIONS

Hines et al.; Development and application of fault detectability performance metrics for instrument calibration verification and anomaly detection; Journal of Pattern Recognition Research (JPRR), vol. 1, No. 1; 2006; pp. 2-15.
Knowles et al.; Reinforcement learning for scheduling of maintenance; In Bramer, M., et al. editors, Proceedings of the 30th Int. Conf. on Artificial Intelligence (SGAI 2010), pp. 409-422, Cambridge, England, UK.

\* cited by examiner

*Primary Examiner* — Sarai Butler
(74) *Attorney, Agent, or Firm* — Kraguljac Law Group, LLC

(57) ABSTRACT

Systems, methods, and other embodiments associated with adaptively determining a preventive maintenance schedule based on historical system operation are described. The prognostic parameter values are continuously partitioned into a number of operating states based on observed maintenance costs associated with the prognostic parameter values. The operating states range from absolutely healthy, one or more degrees of degradation, to fully degraded. A system cost function is used as the discriminant function. The system cost function is an expected maintenance cost when a given preventive maintenance (PM) schedule is adopted. The system cost function calculates the expected cost based on the observed cost of operation in each of the operating states and a probability of the computing system being in each of the operating states as determined by the PM schedule. The PM schedule that minimizes the cost function is determined to be the optimal PM schedule.

20 Claims, 5 Drawing Sheets

ADAPTIVE PREVENTIVE MAINTENANCE FOR COMPUTING SYSTEMS

BACKGROUND

One of the essential elements of active control of a computing system's health is designing and implementing an efficient preventive maintenance schedule. Any action that can be taken to avoid a system failure is considered preventive maintenance. Examples of preventive maintenance include replacement of a failing hardware component, software rejuvenation to clear internal system states, database optimization (restructuring in distributed databases), and controlling environmental conditions in data centers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
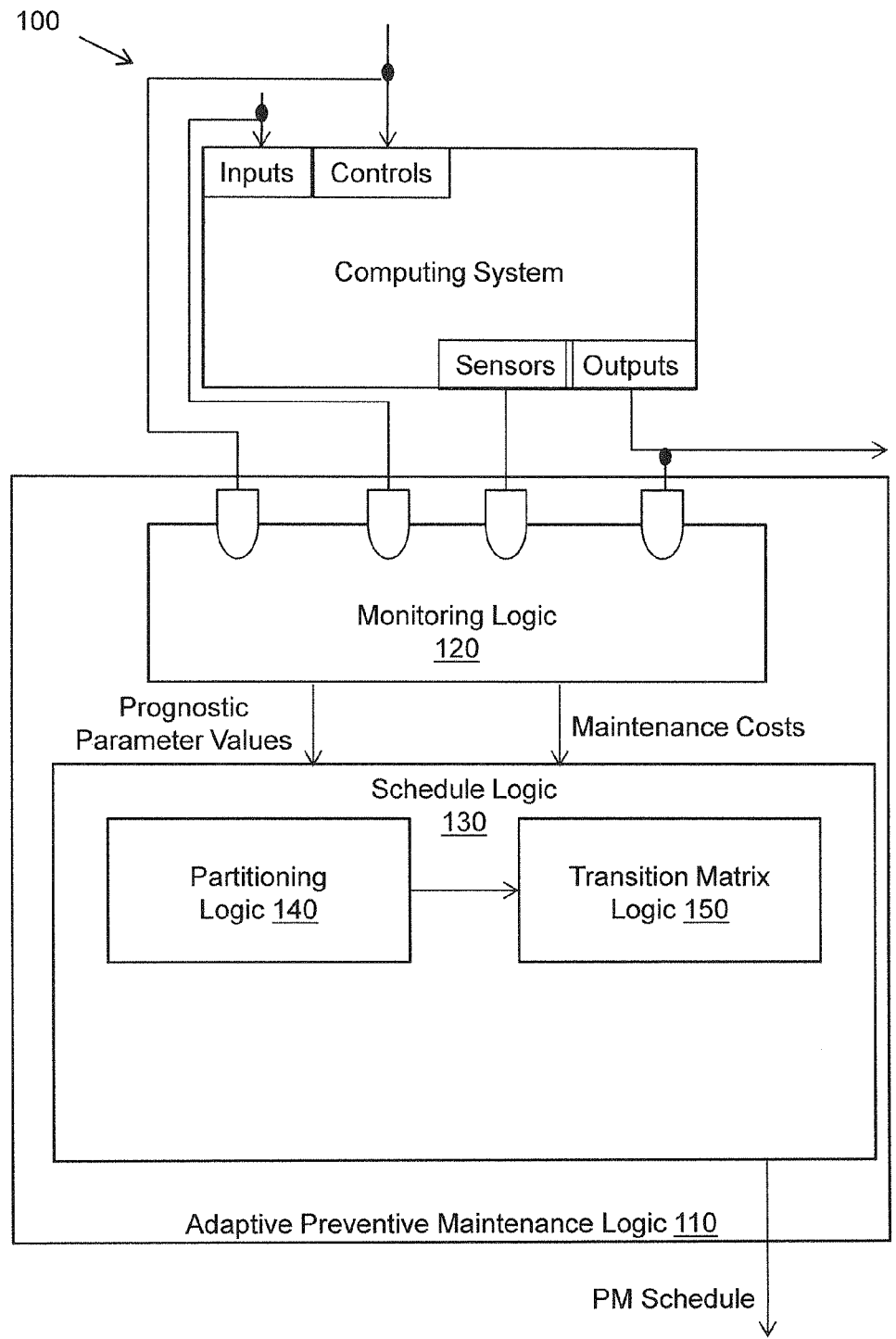
FIG. 1 illustrates one embodiment of a system associated with adaptive preventive maintenance for computing systems.

Observations of signals corresponding to values of selected prognostic parameters that reflect the condition of a monitored computing system may be used to determine the system degradation level and to schedule maintenance if appropriate. This approach is based on the fact that physical or/and software processes leading to the degradation of a system affect the distribution of the prognostic parameter values.

Association of observations with certain system states/condition is a classical task of classification of observations. Traditionally, the problem of classification is considered as a problem of "statistical decision functions". Prognostic parameter values are obtained for classification into normally distributed populations. Criteria of classification are based on the difference between populations' parameters that are inferred from observed data.

Among these criteria are various discriminant functions and the likelihood ratio criterion. However, these criteria are only effective when the observed prognostic parameters are from an absolutely healthy system or from a fully degraded system. Difficulties arise when one needs to discriminate signals in a gray area between absolutely healthy and fully degraded system. In this area the difference between populations' parameters inferred from observed data is hardly noticeable. In other words, one deals with the tails of distributions inferred from observed data, and these tails are somewhat similar even for completely different distributions. This gray area is the domain of preventive maintenance.

Systems and methods described herein adaptively determine an optimal preventive maintenance schedule based on historical system operation. The schedule is determined by continuously revising a partitioning of the prognostic parameter values into a number of operating states based on observed maintenance costs associated with the prognostic parameter values. The operating states range from absolutely healthy, one or more degrees of degradation, to fully degraded.

A system cost function is used as the discriminant function. The system cost function is an expected maintenance cost when a given preventive maintenance (PM) schedule is adopted. The system cost function calculates the expected cost based on the observed cost of operation in each of the operating states and a probability of the computing system being in each of the operating states as determined by the PM schedule. The PM schedule that minimizes the cost function is determined to be the optimal PM schedule.

The systems and methods described herein continuously monitor degrading systems without requiring their complete renewal. The discrimination function (e.g. cost function) depends on the behavior of the system's prognostic parameter in any number of operating states. The extremum of this function corresponds to the optimal maintenance policy. The partitioning of the prognostics parameter values is continuously refined. In one embodiment, the partitioning uses supervised clustering that optimizes the current and predicted cost of preventive maintenance. This allows for faster achievement of the optimal maintenance policy.

The computation of the optimal maintenance schedule for an individual system starts immediately with beginning of the system monitoring and data collection. The optimal maintenance schedule is continuously improved as more information is being accumulated on the behavior of a monitored system. The optimal maintenance schedule is determined based on observed data from a specific individual system without requiring actual failures of the monitored system.

The discrimination of marginally distinct measured signals is one challenge in the creation of preventive maintenance policies. Applying classical methods of statistical classification of observations to the solution of this problem entails considerable difficulties caused by the need to discriminate signals in a gray area between absolutely healthy and fully degraded system. In the gray area, the difference between population parameters inferred from samples is hardly noticeable. Instead of the classical discrimination criteria that minimize in some sense or other the cost of misclassification, the systems and methods described herein utilize a discriminant function that minimizes the expected sum of losses (for example, losses of time) relevant to system preventive maintenance and recovering of the system after its failure.

This discriminant function is developed on the basis of the representation of the observed system degradation process as a Discrete Parameter Markov chain. The extremum of this function determines the discrimination boundary and the optimal time for maintenance. The requirements for the possible deviation of the experimentally obtained Markov process parameters that do not invalidate the obtained optimal rule of maintenance are specified.

The extremum of the discriminant function determines a discrimination boundary and the time for maintenance. It is assumed that the process of system degradation is a Discrete Parameter Markov process. On the basis of observation of the system behavior, a state transition matrix is created for this process that specifies the probabilities of transitioning between operating states given a certain PM schedule. The adequacy of this matrix is continuously checked. Thereby, for the maintenance scheduling, each system is considered as a unique one. The maintaining of the adequate state transition matrix becomes part of the system maintenance.

FIG. 1 illustrates one example embodiment of a system 100 in which a preventive maintenance schedule for a computing system is determined by an adaptive preventive maintenance (PM) logic 110. The adaptive PM logic 110 inputs signals associated with a computing system and outputs a PM schedule that is tailored to the computing system based on historical performance of the computing system and the maintenance costs expended on the computing system.

The adaptive PM logic 110 includes a monitoring logic 120 that is configured to receive selected signals associated with the computing system. In one embodiment, the monitoring logic 120 receives signals corresponding to input signals to the computing system, control signals sent to the computing system, outputs of the computing system, and sensor signals. The sensor signals may communicate information about the physical condition of the computing system (e.g., temperature) and/or environmental conditions. The monitoring logic combines the signals in a predetermined way to produce a prognostic parameter for the computing system. The prognostic parameter is constructed such that fluctuations in the prognostic parameter correspond to fluctuations in the computing system's health.

As the computing system is in operation, the monitoring logic 120 provides values of the prognostic parameter to a schedule logic 130. The schedule logic 130 receives a series if prognostic parameter values as the prognostic parameter fluctuates through a range of values. The monitoring logic 120 also provides maintenance cost information to the schedule logic 130. The maintenance cost is mapped to the prognostic parameter values so that the schedule logic 130 can assign a maintenance cost to the prognostic parameter values. For example, if the computing system is shut down for one hour to replace a failing memory when the prognostic parameter is at value X, the schedule logic may assign a maintenance cost of one hour to prognostic parameter value X. If no maintenance is performed the next time the prognostic parameter value is X, the schedule logic may revise the maintenance cost assigned to X to be a half hour (e.g., the average maintenance cost for the value). The schedule logic 130 uses the monitored prognostic parameter values and the associated maintenance costs to determine an optimal PM schedule.

The schedule logic 130 is configured to optimize a system cost function that calculates an expected maintenance cost when preventive maintenance is performed according to a given PM schedule. PM schedule specifies prognostic parameter values in which preventive maintenance is to be performed. The expected costs are calculated based on the observed maintenance costs associated with the various prognostic parameter values. The schedule logic 130 optimizes the system cost function by selecting a preventive maintenance schedule that minimizes the system cost function.

In one embodiment, the schedule logic 130 determines an optimal PM schedule by modeling the prognostic parameter values and maintenance costs as a Discrete Parameter Markov chain. In this embodiment, the schedule logic includes a partitioning logic 140 and a transition matrix logic 150. Assuming the model of Discrete Parameter Markov chain, the range of values of the observed prognostic parameter is partitioned by the partitioning logic 140 into m distinct partitions corresponding to m distinct operating states. The presence of the parameter in one of m partitions 1, 2, ..., m is classified as presence of the computing system in one of its m operating states. A choice of the number of partitions is dictated by convenience of observation and by the system monitoring capabilities. The number of partitions can be changed in the process of data collection. The computing system is in state 1 when absolutely healthy and in state m when fully degraded (e.g., failed).

Let X(t) be the observed prognostics parameter that determines the system condition (state).

$$q_{ij}=P[X(t+1)=j|X(t)=i] \quad \text{Equation (1)}$$

The term $q_{ij}$ is the stationary probability of the system transitioning from state i to state j. The transition matrix logic 150 estimates a state transition matrix [q_ij] from a sample of sufficient size of prognostic parameter values called a training sample in one terminology.

$$\tilde{q}_{ij} = \frac{n_{ij}}{n_i} \quad \text{Equation (2)}$$

In Equation (2) n_ij is the number of transitions from state i to state j, and n_i is the total number of transitions from the i-th state to the other states (including to remain in state i). This matrix can be considered as an analogy of parameters of population distribution in the classical case of classification.

$E(T_k)$ denotes the maintenance cost associated with an operating state k. In one embodiment, the maintenance cost is the average value of sum of times spent for the system preventive maintenance and times needed to recover the system after its failure, if maintenance is performed in states k, k+1, ..., m. The minimum of $E(T_k)$ over an infinite time interval is proposed to use as the discriminant function. The overall system cost can be expressed as $$C(k) = \lim_{t \to \infty} \frac{\sum_{i=k}^{m} E(T_k)}{t} = \sum_{j=1}^{m} \pi_j T_k(j). \quad \text{Equation (3)}$$

In Equation (3), $\pi_j$ is the steady-state probabilities of the system being in the j-th state.

$$\pi_j = \sum_{i=1}^{m} \pi_i q_{ij} \quad \text{Equation (4)}$$

$$\sum_{j=1}^{m} \pi_j = 1, \quad \text{Equation (5)}$$

where j=1, ..., m and $$T_k(j) = \begin{cases} 0 & k = 1, 2, \ldots, (k-1) \\ T_{maintenance} & j = k, (k+1), \ldots, (m-1) \\ T_{recovery} & j = m \end{cases} \quad \text{Equation (6)}$$

In one embodiment, $T_{maintenance}$ is the average time of the preventive maintenance and $T_{recovery}$ is the average time needed to recover the system after its failure. It is assumed that $T_{maintenance}$ is less than $T_{recovery}$. Performing maintenance in the i-th state means that probability $q_{i1}$ becomes equal to 1, and the rest of the probabilities of the i-th row become 0, if the maintenance results in complete renewal. This way the schedule of maintenance is embedded into the state transition matrix [q_ij] that is calculated by the transition matrix logic 150.

In one embodiment the partitioning logic 140 partitions the prognostics parameter using a supervised clustering classification method with R-functions. The overall cost function Equation 3 is used as the objective function for the evaluation of goodness of clustering. Partitioning the prognostics parameter on the fly as new observations become available allows for faster approaching of the optimal preventive maintenance schedule. The partitioning involves computing the optimal number of intervals and optimal width of each interval.

Sometimes, complete renewal cannot be guaranteed. In this case, the probabilities of transition to the states, into which maintenance moves the system should be determined. For example, a non-perfect rejuvenation of memory moves the software system into the i-th state. In this case, the i-th row of the state transition matrix can be specified as ($q_{i1}$, $q_{i2}$, $q_{i3}$, 0, ..., 0) with $q_{i1}+q_{i2}+q_{i3}=1$.

By these means, a schedule of maintenance is defined in terms of states of the system and encoded in the state transition matrix determined by the transition matrix logic 150. The maintenance rule is "start maintenance if the observation belongs to one of the intervals k, k+1, ..., (m−1)."

To determine the optimal PM schedule, the schedule logic 130 finds k that minimizes Eq. (3) with constraints in Equations (4)-(6). In general, this is a linear programming problem; however, for small values of m, the optimum can be found by enumerating and computing. Notice that in the terms of the theory of reliability one seeks a schedule of maintenance that maximizes system availability.

Figure 2:
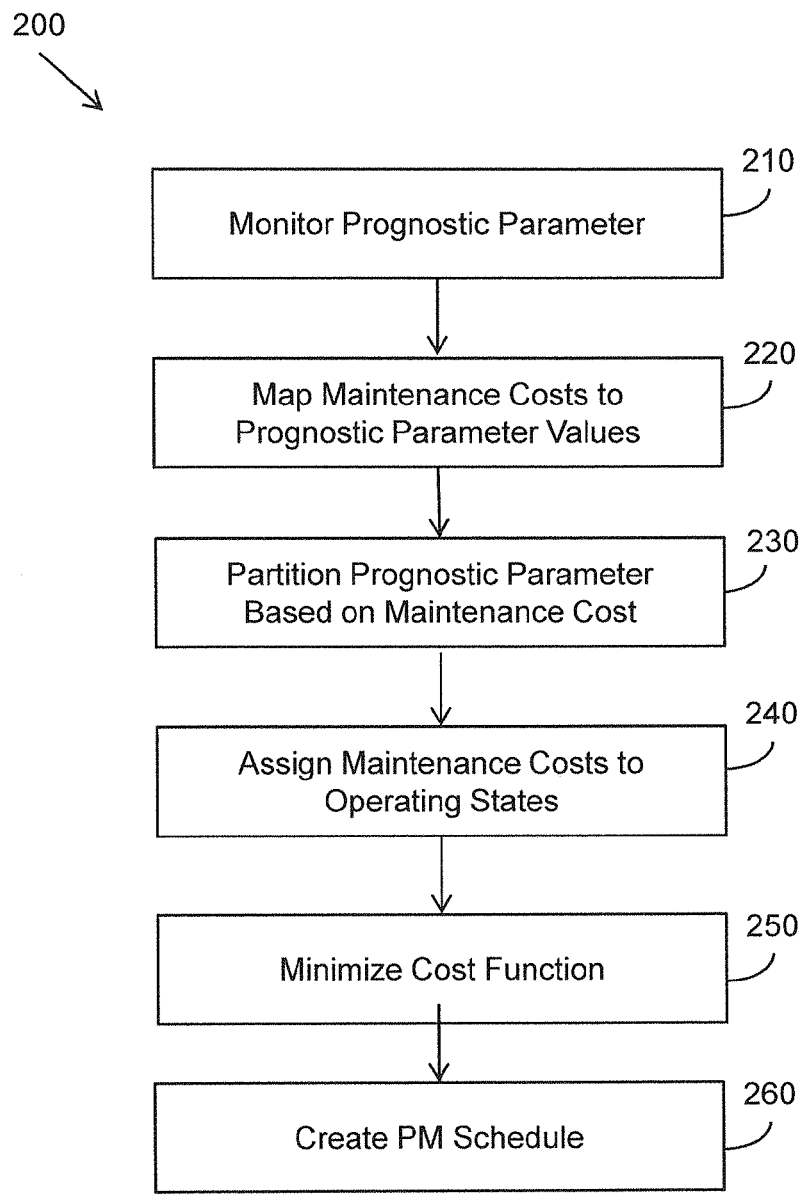
FIG. 2 illustrates one embodiment of a method associated with adaptive preventive maintenance for computing systems.

FIG. 2 illustrates one example embodiment of a method 200 associated with adaptive preventive maintenance for computing systems. The method includes, at 210, monitoring a prognostic parameter of a computing system. At 220, respective maintenance costs of the computing system are mapped to respective prognostic parameter values. The maintenance cost mapped to a given value is an accumulation of maintenance costs while the prognostic parameter is at the given value. At 230, the method includes partitioning values of the prognostic parameter into two or more partitions based on the maintenance cost. Each partition corresponds to a computing system operating state. At 240, maintenance cost for the values in a partition are assigned to an operating state that corresponds to the partition. At 250, a system cost function is minimized. The system cost function is an expected maintenance cost when preventive maintenance is performed in the operating states according to a given preventive maintenance schedule. At 260, the method includes selecting a preventive maintenance schedule that minimizes the system cost function.

In one embodiment, the method includes continuing to monitor the prognostic parameter to collect an accumulation of prognostic parameter values that includes values used to determine a present set of partitions. At predetermined intervals, the operating states are revised by re-partitioning the accumulation of prognostic parameter values to create a set of revised partitions and assigning the maintenance cost for values in a revised partition to a revised operating state that corresponds to the partition. A different preventive maintenance schedule is selected that minimizes the system cost function based, at least in part, on the revised operating states.

In one embodiment, the partitioning is performed by clustering the values in a manner that optimizes the maintenance cost and partitioning the prognostic parameter into respective partitions based on the clustered values. The clustering may be performed using R-functions.

In one embodiment, the method includes estimating respective probabilities of the computing system operating in respective operating states as a function of a preventive maintenance schedule based, at least in part, on the monitored prognostic parameter values. In this embodiment, the system cost function specifies the expected maintenance cost of the computing system based, at least in part, on respective probabilities of the computing system operating in respective operating states as a function of a preventive maintenance schedule.

Figure 3:
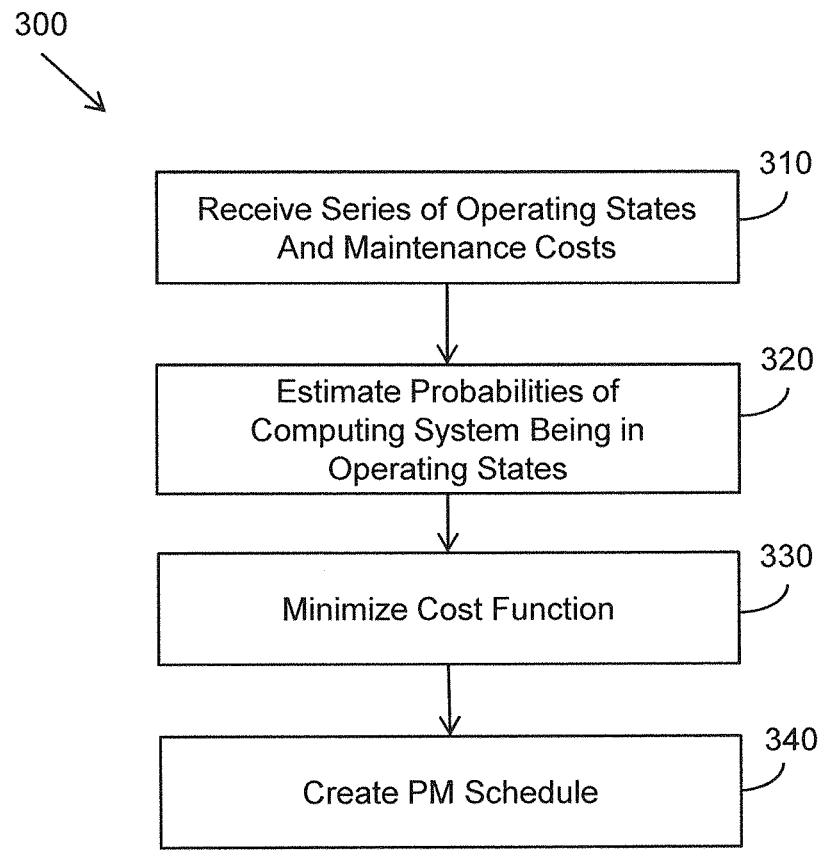
FIG. 3 illustrates one embodiment of a method associated with adaptive preventive maintenance for computing systems.

FIG. 3 illustrates one example embodiment of a method 300 associated with adaptive preventive maintenance for computing systems. The method 300 includes, at 310, receiving a series of operating states in which a computing system is operating and respective maintenance costs assigned to respective operating states. The maintenance cost assigned to an operating state corresponds to a cost of maintenance performed on the computing system while the computing system was in the operating state. At 320, respective probabilities of the computing system operating in respective operating states is estimated as a function of a preventive maintenance schedule based, at least in part, on the series of operating states. At 330, the method includes minimizing a cost function that calculates an expected maintenance cost of the computing system based, at least in part, on the estimated probabilities of the computing system operating in respective operating states when a given preventive maintenance schedule is adopted. At 340, the method includes selecting a preventive maintenance schedule that minimizes the system cost function.

In one embodiment, the method includes receiving a revised series of operating states and maintenance costs. At predetermined intervals, the cost function is revised by re-estimating respective probabilities of the computing system operating in respective operating states as a function of a preventive maintenance schedule based, at least in part, on the revised series of operating states. The cost function is re-minimized based, at least in part, on the re-estimated probabilities.

In one embodiment, the method includes estimating a state transition matrix based on transitions between operating states in the series of operating states. The state transition matrix specifies respective probabilities of the computing system operating in respective operating states given a certain preventive maintenance schedule.

Figure 4:
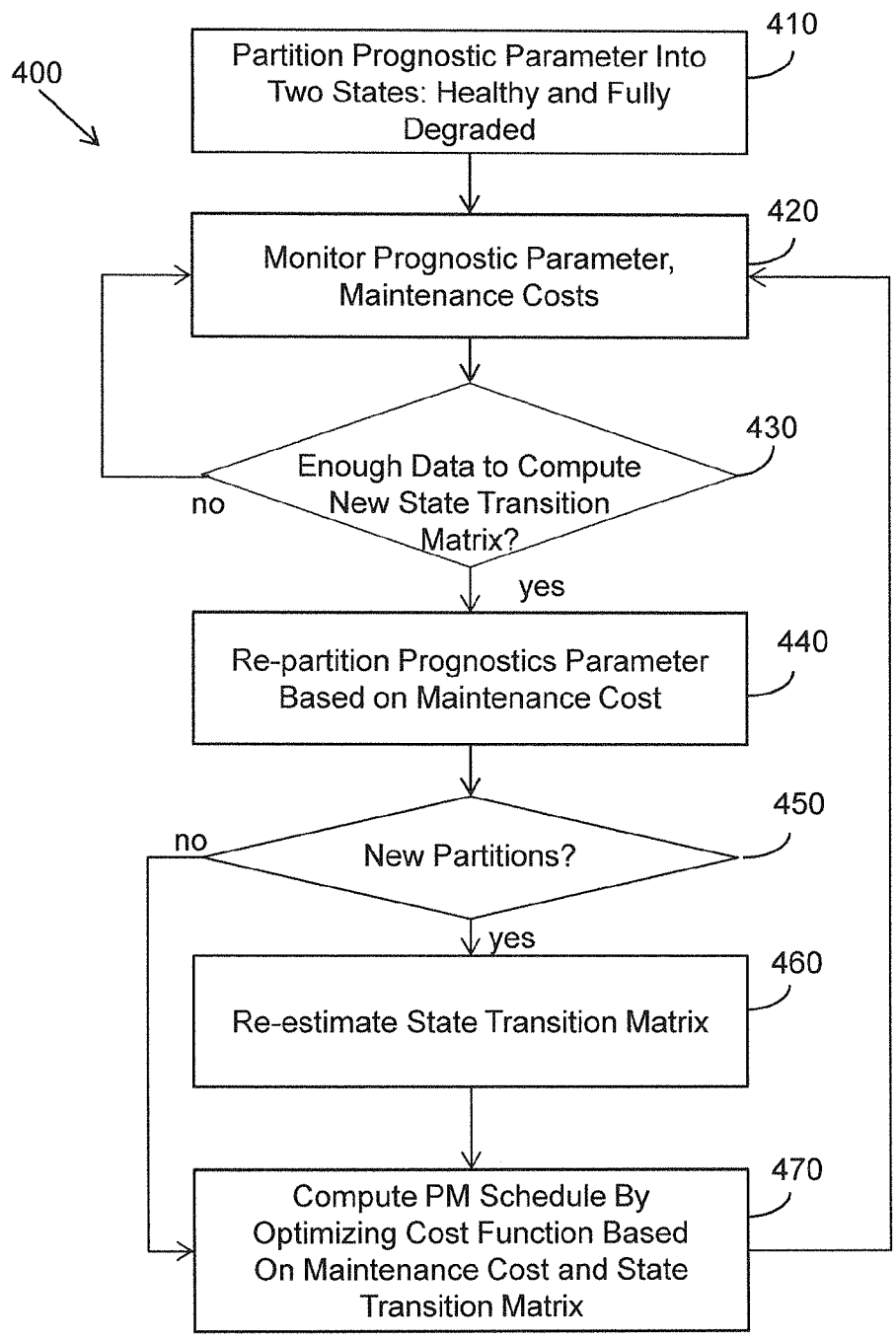
FIG. 4 illustrates one embodiment of a method associated with adaptive preventive maintenance for computing systems.

FIG. 4 illustrates one example embodiment of a method 400 associated with adaptive preventive maintenance for computing systems. At 410, the method starts by partitioning the range of possible values of the prognostics parameter into two (equal-sized) intervals. These two partitions correspond to two system states: 1 and 2. An initial PM schedule is also established that outlines maintenance to be performed when the computing system is in state 2. At 420, the method includes accumulating data for prognostics parameter values and maintenance costs.

At 430, a determination is made as to whether enough data has been accumulated to compute a new state transition matrix. The amount of data that is accumulated prior to calculating a state transition matrix is determined based on an acceptable level of uncertainty for the state transition matrix. Using the system cost function as the discriminant function leaves open the classical question of misclassification (errors of the first and the second kind). The risk is associated with the uncertainty of the matrix inferred from the sample. The validity of the state transition matrix is determined by the proximity of the experimentally obtained entries of the matrix to its true values. However, the admissible bounds for a fluctuation of entries of the experimental state transition matrix around its true values can be found. These bounds are determined by maximum entries deviation that does not invalidate the obtained optimal maintenance rule.

In order to estimate admissible bounds of the entries of the state transition matrix, the values of the entries may be varied (e.g., slightly rock the matrix) using statistical simulation. Therefore, for the value of the risk specified beforehand, the requirement that limits the uncertainty of the state transition matrix can be specified as the required minimum of the number of observations that should be made to obtain the state transition matrix. The number of observation necessary for estimating $q_{ij}$ element can be found by deriving the expression for the difference of the maximum and minimum values of $q_{ij}$ that do not change the optimal maintenance rule.

$$\Delta_\beta = (q_{ij})_{max} - (q_{ij})_{min} = \frac{2l_\beta \sqrt{\frac{\tilde{q}_{ij}(1-\tilde{q}_{ij})}{n_{ij}} + \frac{l_\beta^2}{4n_{ij}^2}}}{1 + \frac{l_\beta^2}{n_{ij}}}.$$

Equation (7)

where $$l_\beta = \arg F\left(\frac{1+\beta}{2}\right),$$

and F(x) is the inverse function of $$F(x) = \frac{1}{\sqrt{2\pi}} \int_{-\infty}^x e^{-\frac{t^2}{2}} dt.$$

Concerning experimental finding of matrix $[q_{ij}]$, the collection of data for the estimation of the state transition matrix entries is a necessary part of maintenance. The data are collected with the beginning of the maintenance. The times of the first maintenance can be defined on the basis of expert opinion. When the volume of the collected data allows for calculating a minimum number of partitions and corresponding transition probabilities of matrix $[q_{ij}]$, the method continues at 440.

At 440, the optimal partitioning of the prognostics parameter values is found that optimizes cost Equation 3 subject to the constraints of Equations 4-6. If a new partitioning is found at 450, at 460 the state transition matrix is re-estimated based on the new operating states. At 470, a PM schedule is selected that minimizes the cost equation 3. If at 450 new partitions are not found, the previous partitioning of the prognostic parameter and state transition matrix are used in the cost equation and at 470, a PM schedule is selected that minimizes the cost equation 3.

The maintenance schedule will come nearer to the optimum maintenance in the process of accumulation of information on the system behavior. It is important to note that no system failure is required in order to fully specify matrix [q_ij]. The transition probabilities to pass to the failed state are defined from the condition $\Sigma_{j=1}^m q_{ij}=1$.

Figure 5:
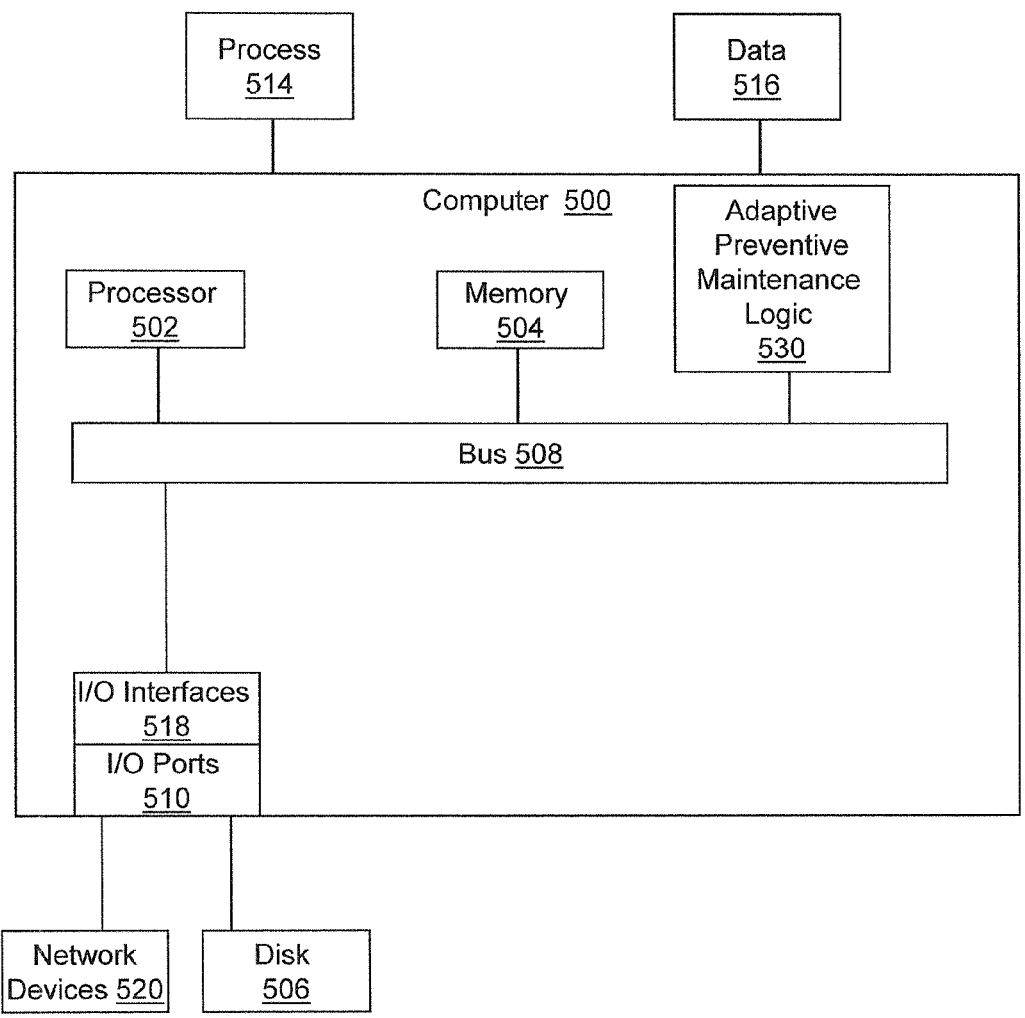
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include an adaptive preventive maintenance logic 530 configured to adaptively determine an optimal PM schedule for a computing system. In different examples, the adaptive preventive maintenance logic 530 may be implemented in hardware, a non-transitory computer-readable medium with stored instructions, firmware, and/or combinations thereof. While the adaptive preventive maintenance logic 530 is illustrated as a hardware component attached to the bus 508, it is to be appreciated that in one example, the adaptive preventive maintenance logic 530 could be implemented in the processor 502.

In one embodiment, adaptive preventive maintenance logic 530 is a means (e.g., hardware, non-transitory computer-readable medium, firmware) for adaptively determining an optimal PM schedule for a computing system. The means may be implemented, for example, as an ASIC programmed to adaptively determine an optimal PM schedule. The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods illustrated in FIGS. 3-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
    monitoring a prognostic parameter of a computing system;
    mapping respective maintenance costs of the computing system to respective prognostic parameter values such that the maintenance cost mapped to a given value is an accumulation of maintenance costs while the prognostic parameter is at the given value;
    partitioning values of the prognostic parameter into two or more partitions based on the maintenance cost, wherein each partition corresponds to a computing system operating state;
    assigning the maintenance cost for the values in a partition to an operating state that corresponds to the partition; and
    selecting a preventive maintenance schedule that minimizes a system cost function that calculates an expected maintenance cost when preventive maintenance is performed in the operating states according to a given preventive maintenance schedule.

2. The non-transitory computer-readable medium of claim 1, the method further comprising:
    continuing to monitor the prognostic parameter to collect an accumulation of prognostic parameter values that includes values used to determine a present set of partitions, and at predetermined intervals, revising the operating states by:
        re-partitioning the accumulation of prognostic parameter values to create a set of revised partitions; and
        assigning the maintenance cost for values in a revised partition to a revised operating state that corresponds to the partition; and
    selecting a different preventive maintenance schedule that minimizes the system cost function based, at least in part, on the revised operating states.

3. The non-transitory computer-readable medium of claim 1 wherein partitioning the prognostic parameter comprises:
    clustering the values in a manner that optimizes the maintenance cost; and
    partitioning the prognostic parameter into respective partitions based on the clustered values.

4. The non-transitory computer-readable medium of claim 3, wherein clustering is performed using R-functions.

5. The non-transitory computer-readable medium of claim 1, the method further comprising:
    estimating respective probabilities of the computing system operating in respective operating states as a function of a preventive maintenance schedule based, at least in part, on the monitored prognostic parameter values; and
    wherein the system cost function specifies the expected maintenance cost of the computing system based, at least in part, on respective probabilities of the computing system operating in respective operating states as a function of a preventive maintenance schedule.

6. The non-transitory computer-readable medium of claim 5, wherein estimating respective probabilities comprises estimating a state transition matrix based on transitions between operating states in the monitored prognostic parameter values, wherein the state transition matrix specifies respective probabilities of the computing system operating in respective operating states given a certain preventive maintenance schedule.

7. The non-transitory computer-readable medium of claim 6, wherein estimating the state transition matrix comprises modeling a sequence of operating states corresponding to the monitored prognostic parameter values as a Discrete Parameter Markov Chain.

8. The non-transitory computer-readable medium of claim 1, wherein assigning the maintenance cost to the operating state comprises assigning an average of the maintenance costs mapped to the prognostic parameter values contained in the operating state.

9. The non-transitory computer-readable medium of claim 1, wherein assigning the maintenance cost to the operating state comprises assigning an amount of time spent to perform preventive maintenance while the computing system is in the operating state.

10. A computing system, comprising:
    a monitoring logic configured to monitor a prognostic parameter of a computing system and to associate an observed maintenance cost with respective prognostic parameter values, wherein the maintenance cost associated with a given value corresponds to an accumulation of maintenance costs incurred while the prognostic parameter is at the given value;
    a schedule logic configured to optimize a system cost function that calculates an expected maintenance cost when preventive maintenance is performed according to a given preventive maintenance schedule, wherein the preventive maintenance schedule specifies prognostic parameter values that indicate that preventive maintenance is to be performed, and further wherein the optimizing comprises selecting a preventive maintenance schedule that minimizes the system cost function.

11. The computing system of claim 10, wherein the schedule logic further comprises:
    a partitioning logic configured to:
        partition values of the prognostic parameter into two or more partitions based on the maintenance costs associated with the values, wherein each partition corresponds to a computing system operating state; and
        assign the maintenance cost for the values in a partition to an operating state that corresponds to the partition; and wherein the schedule logic is configured to select a preventive maintenance schedule that minimizes a system cost function that is an expected maintenance cost when preventive maintenance is performed in the operating states according to a given preventive maintenance schedule.

12. The computing system of claim 11, where the partition logic is configured to:
cluster the values in a manner that optimizes the maintenance cost; and
partition the prognostic parameter into respective partitions based on the clustered values.

13. The computing system of claim 11, wherein the schedule logic further comprises a transition matrix logic configured to:
estimate respective probabilities of the computing system operating in respective operating states as a function of a preventive maintenance schedule based, at least in part, on the monitored prognostic parameter values; and
wherein the system cost function specifies the expected maintenance cost of the computing system based, at least in part, on respective probabilities of the computing system operating in respective operating states as a function of a preventive maintenance schedule.

14. The computing system of claim 13, wherein the transition matrix logic is configured to estimate a state transition matrix based on transitions between operating states in the monitored prognostic parameter values, wherein the state transition matrix specifies respective probabilities of the computing system operating in respective operating states given a certain preventive maintenance schedule.

15. A non-transitory computer-readable medium storing computer-executable instructions that when executed by a computer cause the computer to perform a method, the method comprising:
receiving a series of operating states in which a computing system is operating and a respective maintenance cost assigned to each respective operating state, where the maintenance cost assigned to an operating state corresponds to a cost of maintenance performed on the computing system while the computing system was in the operating state;
estimating respective probabilities of the computing system operating in respective operating states as a function of a preventive maintenance schedule based, at least in part, on the series of operating states; and
optimizing a cost function that calculates an expected maintenance cost of the computing system based, at least in part, on the estimated probabilities of the computing system operating in respective operating states as a function of a preventive maintenance schedule, wherein the optimizing comprises selecting a preventive maintenance schedule that minimizes the system cost function.

16. The non-transitory computer-readable medium of claim 15, the method further comprising:
receiving a revised series of operating states and maintenance costs, and at predetermined intervals, revising the cost function by:
re-estimating respective probabilities of the computing system operating in respective operating states based, at least in part, on the revised series of operating states; and
re-optimizing the cost function based, at least in part, on the re-estimated probabilities.

17. The non-transitory computer-readable medium of claim 15, wherein estimating respective probabilities of the computing system being in respective operating states comprises estimating a state transition matrix based on transitions between operating states in the series of operating states, where the state transition matrix specifies respective probabilities of the computing system operating in respective operating states given a certain preventive maintenance schedule.

18. The non-transitory computer-readable medium of claim 17, wherein estimating the state transition matrix comprises modeling the series of operating states as a Discrete Parameter Markov Chain.

19. The non-transitory computer-readable medium of claim 15, wherein the maintenance cost assigned to a given operating state comprises an average of the maintenance costs incurred each time the computing system is in the given operating state.

20. The non-transitory computer-readable medium of claim 15, wherein the maintenance cost assigned to a given operating state comprises an amount of time spent to perform preventive maintenance while the computing system is in the given operating state.

* * * * *